United States Patent [19]

Beauman et al.

[11] Patent Number: 4,594,361
[45] Date of Patent: Jun. 10, 1986

[54] STABILIZED POLYBROMIDE RESINS AND METHOD OF PREPARATION

[75] Inventors: William H. Beauman, Chicago; Dean J. Jarog, Villa Park; Steven H. Micklin, Chicago, all of Ill.

[73] Assignee: Everpure, Inc., Westmont, Ill.

[21] Appl. No.: 674,609

[22] Filed: Nov. 26, 1984

[51] Int. Cl.$^4$ .............................................. C02F 1/50
[52] U.S. Cl. ...................................... 521/28; 521/31; 521/32; 210/502; 210/754; 424/79
[58] Field of Search ............... 521/28, 32, 31; 424/79; 210/501

[56] References Cited

U.S. PATENT DOCUMENTS

| 3,316,173 | 4/1967 | Mills | 424/79 |
| 3,436,345 | 4/1969 | Goodenough | 521/32 |
| 3,462,363 | 8/1969 | Mills | 424/79 |
| 4,187,183 | 2/1980 | Hatch | 424/79 |
| 4,238,477 | 12/1980 | Lambert | 424/79 |

Primary Examiner—C. Warren Ivy
Attorney, Agent, or Firm—Frank R. Thienpont

[57] ABSTRACT

Polybromide resin beads for disinfecting potable water are stabilized as to bromide content by:
(A) initially charging excess bromine into an aqueous slurry of quaternary ammonium amine exchange resin beads;
(B) removing external moisture to provide moist sticky beads;
(C) passing gaseous drying agent at controlled temperature and velocity effective to gradually remove internal moisture and excess bromine; and
(D) continuing the gradual drying until dry, free-flowing beads having less than 5% water and 17 to 47% bromine are obtained.

9 Claims, No Drawings

STABILIZED POLYBROMIDE RESINS AND METHOD OF PREPARATION

FIELD OF INVENTION, BACKGROUND, AND PRIOR ART

The field of this invention is polybromide resins for use in disinfecting water. The preparation and use of such resin disinfectants are described in prior patents (see, for example, U.S. Pat. Nos. 3,316,173, 3,436,345, and 3,462,363), and have been in commercial use for a number years as disinfectants for potable water. Everpure, Inc. of Westmont, Ill. markets bromination systems for treating drinking water in marine applications, such as ships, submarines, and offshore oil well drilling rigs. The disinfecting agent is a strong base anion exchange resin in bromide form loaded with bromine. When water is passed through the bed of the resin beads, which are contained in disposable cartridges, bromine ($Br_2$) is released into the water.

In prior art commercial practice, beads of quaternary ammonium anion exchange resin are usually converter from a chloride form to a bromide form, and are loaded with elemental bromine in the form of a polybromide complex ($Br_{\overline{n}}$). The number of bromines in the polybromide complex "n" can be 3, 5, or 7, representing, respectively, tribromide ($Br_{\overline{3}}$), pentabromide ($Br_{\overline{5}}$), and heptabromide ($Br_{\overline{7}}$). The loading of the resin is carried out in an aqueous slurry, in which the water phase contains a bromide salt (e.g., sodium bromide) and elemental bromine. After the resin beads have been loaded with the bromine, it has been the practice to drain and aspirate the beads to remove external water, while leaving the beads internally in moist condition. The beads have then been packaged in sealed cartridges for shipment, storage, and use in the marine applications referred to above.

Commercial brominating cartridges prepared as described have been found to have two disadvantages in use. When they are stored for a number of months or years, as may be required in marine applications, the effective bromine content of the resin continually decreases, and may reach such a low level that the needed amount of bromine is not released into the water during use. Ideally, the resin beads should release bromine at a controlled and predeterminable level for use in a proportioning systems where the bromine is picked up by a side stream, and then combined in predetermined proportions with the main stream of water to be treated. It has been found that the resin cartridges after long storage may not provide the desired predetermined release rate, and, after long storage, the bromine content of the cartridge may have been reduced to such a low level that the cartridges cannot be effectively used at all. Such loaded resin deterioration is particularly noticeable with storage under relatively warm conditions, such as temperatures from 80° to 100° F.

Another disadvantage encountered in field use of the brominating cartridges is that of an initially undesirably high rate of release of bromine. This usually occurs during passage of the first several hundred gallons of water through the cartridges. Excess bromination of the water can result, and such a high release rate can be misleading to the users. For example, if the bromination system is adjusted to proportion with respect to the initial high rate of release, when the release rate drops to the lower level of sustained release it may be assumed that the cartridge has ceased to perform satisfactorily and should be discarded. Actually, it is the lower sustained release rate which is employed for long-term use of the cartridge. For example, a cartridge containing 1.25 kilograms of resin can be sufficient to feed 1 part per million of bromine to 200,000 liters of water.

SUMMARY OF INVENTION

Stabilized polybromide resin products are prepared by the method of this invention which provides important advantages over prior processes and products as described above. By the manufacturing method improvement of this invention, polybromide resins can be prepared which provide increased bromine stability, which avoid an initial excessive rate of release, and which provide more uniform continuing bromine release. The products can therefore be stored for longer periods of time while remaining effective in use, and without having the disadvantage of an unduly high release rate during initial use.

In prior practice, the resin beads after loading were left moist, and packaged in this condition. While it was recognized that storing of the beads could result in a significant loss of bromine, this was not known to be related to moist storage. In fact, there was no known disadvantage to leaving the resin beads in moist condition, nor any known advantage in drying the beads to a lower moisture content than that obtained by draining and aspirating of the beads to remove external water. It has now been discovered, however, that carefully drying the beads to specified lower moisture content can be a means to achieving greater stabilization of the loaded beads. Finally, it has been found that the method improvement of this invention is particularly advantageous where the resin beads contain 25 to 35% by weight of bromine ($Br_2$) and are essentially in a polybromide form where substantial amounts of penta- and/or heptabromide are present (viz. $Br_{\overline{5}}$ and $Br_{\overline{7}}$).

In other words, the resin is a mixture of $Br_{\overline{3}}$ and $Br_{\overline{5}}$ or $Br_{\overline{5}}$ and $Br_{\overline{7}}$. Fortunately, this form of the resin corresponds with that for commercial use wherein the resin beads contain around 30–32% $Br_2$ by weight.

On theoretical grounds, it is believed that part of the water in the moist beads may be intimately associated with the polybromide water of solvation. The bromides may be arranged in linear chains in which the first $Br_2$ group is associated with the bromide ion (Br—) as a tribromide group ($Br_{\overline{3}}$). The additional $Br_2$ group is visualized as being in the form of chains extending from the tribromide group. If this is correct, the water of solvation may be primarily associated with the second or third $Br_2$ groups in the chains. Removal of water by drying would therefore have been expected to remove bromine along with the water of solvation. In accordance with the present invention, however, gradual drying can be employed under mild conditions while limiting bromine loss to a commercially acceptable level. At the same time, the water content of the beads can be reduced to a level at which the improved storage stability is obtained. Moreover, for a reason which is not fully understood, the gradual drying process produces a resin where the initial release rate is comparable to or only slightly higher than the subsequent sustained release rate for long term use.

Moist polybromide resin beads as previously produced usually contained around 10% by weight water or more. It was not known what part of this water represents free water within the beads as distinguished from water of solvation. However, the practice of the present invention does not require such a precise distinction. If the final moisture content is reduced to 5% or lower the final moisture content does not appear to be highly critical. Probably, however, the gradual drying first removes most of the free water from the beads, leaving part or all of the water of solvation. In general, the final moisture content is in the range of 0.2 to 4% by weight, and preferably in this range from about 0.5 to 2.0%. The effect of moisture removal may be to suppress bromine loss by hydrolysis. It is known that elemental bromine reacts with water to form hypobromous acid, which can decompose to hydrogen bromide and oxygen, both volatile substances.

DETAILED DESCRIPTION

Strong base anion exchange resins which may be used in practicing the method of this invention are quaternary ammonium anion exchange resins. They comprise porous beads of a resin material providing anion exchange sites with quaternary ammonium groups. The resins may be formed from styrene polymers which provide benzyltrimethylammonium anion exchange sites. Such resins are sold commercially by the Dow Chemical Company, Midland, and other United States suppliers. Specific commercial resins which may be used are identified below.

| Company | Trade Designation | Ion Exchange Capacity |
|---|---|---|
| Rohn & Haas | IRA 402 | 1.20 mEq/ml |
| Ionac Sybron | ASB-IP | 1.3 Meq/ml |
| Diamond Shamrock | A-109 | 1.4 mEq/ml |

The porous resin beads can be loaded with bromine in the manner previously known and used commercially. For example, quaternary ammonium beads in the chloride form are slurried in water containing a bromide salt, such as sodium bromide, or other water-soluble bromide. The amount of bromide ion present should be greater than the ion exchange capacity of the resin beads, so that all of the ion exchange sites of the beads will be converted to the bromide form leaving excess bromide ion in the solution. Either during the conversion of the resin to the bromide form or subsequently, elemental bromine is introduced into the aqueous slurry and contacted with the beads. The amount of bromine introduced is selected to provide a specified amount of bromine ($Br_2$) in the beads. For the purposes of the present invention, the beads should be initially loaded with excess bromine above the bromine content desired in the final product. For example, the initial bromine loading can be in the range of 20 to 50% by weight (based on the loaded resin) to obtain a final loading of 17 to 47%. With that amount of loading, the exchange sites will be at least partially in the pentabromide form, or a mixture of pentabromide and heptabromide. In a preferred procedure, the initial loading is at a level of from 28 to 38% bromine to obtain a final loading of 25 to 35%.

As in prior practice, residual supernatant solution is drained from the beads, and the beads are subjected to suction aspiration. This will remove most of the external water therefrom while leaving the beads internally moist. In accordance with the present invention, the moist beads are then subjected to gradual drying under mild drying conditions. Preferably a moisture-evaporating carrier gas, such as low humidity air, is passed through a mass of the moist beads at a controlled temperature and velocity. For example, air temperatures of from 90° to 120° F. can be used together with air velocities of around 1200 to 1400 cubic feet per minute, and the drying continued for 60 to 120 minutes until the desired final moisture level is obtained.

Starting with moist beads containing about 9 to 11% moisture, the gradual drying is continued until the moisture content is reduced below 5%, such as a moisture content in the range of 0.2 to 4.0% by weight. The drying is sufficient to convert the damp sticky beads to an externally dry free-flowing non-lumping condition. Preferably, the final moisture content is within the range from about 0.5 to 2.0%. From an analytical standpoint, exact quantitative determinations of moisture content may require specialized analytical equipment, such as an NMR Analyzer instrumented for measuring low moisture contents. One suitable apparatus is the IBM Instruments Co. Minispec PC/20 NMR Analyzer. In commercial practice, product quality can be controlled through the use of specified predetermined drying conditions.

The drying of the beads, although carried out gradually, as described, will result in the removal of some bromine. This is the reason that the beads are initially loaded with excess bromine. For a final bromine content in the range of 22 to 45% by weight, the resin can be initially loaded to 25 to 50% bromine. The final product, preferably, is at least partially in the form of higher polybromide than tribromide. Where the initial loading is at the preferred level of from about 28 to 38% bromine, a final bromine content of from 25 to 35% is advantageous, and this provides substantial amounts of the higher polybromides.

After completion of drying to the reduced water and bromine content, as described above, the resin beads are ready for packaging in cartridges.

The following examples provide further details of preferred commercial manufacturing procedures, and also experimental data illustrating the advantages of the stabilized polybromide resin.

COMMERCIAL EXAMPLE

Twenty-five pounds of sodium bromide are dissolved by stirring in 15 gallons of water of appropriate purity in a 30-gallon cylindrical polyethylene vat. After five minutes, 110 pounds of strong-base anion exchange resin in chloride from, as described in the first paragraph of the "Detailed Description." chloride form to bromide form. Then 8.75 liters of elemental, liquid bromine are slowly added to the slurry and mixed for ten minutes to form the polybromide complex. This is sufficient bromine to produce a nominal loading of 35.3% bromine. A wet density test is conducted to verify proper loading of the wet polybromide resin. The entire polybromide resin/mother liquor slurry is transferred to a draining vat fitted with vacuum filters in the bottom, where the wet polybromide resin is aspirated for 60 minutes, removing most of the interstitial moisture and producing a transitional product containing approximately 10% water.

Seventy pounds of the damp polybromide resin are transferred to the drying drum. The drying drum is a screened cylinder situated inside an environmental chamber ("shroud") having strip heaters to raise incoming ambient air temperature to 90°–120° F. This heated air is drawn through the screened sides of the drum at a rate of 1,200–1,400 cubic feet per minute by a blower linked to one end of the drum. The drum is continuously rolled on its side at a rate of 30 revolutions per minute by a system of motordriven rollers during the drying process. Drying time is variable, depending on ambient air humidity, but after 30 minutes' drying time the apparatus is stopped and the polybromide resin is examined every ten minutes. When the polybromide resin is perfectly free-flowing and devoid of lumps, a sample is taken and sealed in a screw-cap glass vial, and the drying process is resumed. Samples are taken every ten minutes until the last sample remains perfectly free-flowing and devoid of lumps after standing undisturbed for ten minutes. The now dried and stabilized polybromide resin has thus been subjected to only ten minutes' drying more than necessary and is ready for packaging. The finished product will conform to the desired final loading range of 28–32% bromine and less than 5% water, preferably not over 2% water. The granules will remain free-flowing in storage and will not aggregate into lumps.

In a series of comparative drying tests, drying conditions and equipment were used as described above, starting with the drained aspirated resin. Drying times were varied from 1.5, 3, and 4 hours. NMR analyses of water contents were made for the dried beads with the results shown in Table A.

TABLE A

| Samples | Condition | Approx. Wt. % H$_2$O |
| --- | --- | --- |
| Drained resin | Wet, sticky | 10 |
| 1.5 hr. drying | Slightly damp | 4 |
| 3 hr. drying | Free flowing[1] | 2 |
| 4 hr. drying | Free flowing[2] | 0.7 |

[1]No lumps after 10 min, standing
[2]No lumps after 24 hr. standing

EXPERIMENTAL EXAMPLES

Fresh, wet polybromide resin containing 30% Br$_2$ was placed in a Büchner funnel, and ambient room air was drawn through for eight hours. At the end of that time, the material was dry to the touch, was free-flowing, and had lost only 3% of the bromine originally present. The final Br$_2$ content was about 27%.

The air-dried resin prepared as described was compared with the original moist resin. In one comparison, examples were placed in two-inch columns and water passed downwardly therethrough at the rate of 0.5 gal./min. until one gallon had passed. The results of the comparison are shown below in Table B.

TABLE B

| Samples | Initial Release Rates Maximum Br$_2$ During Initial 5% of Run |
| --- | --- |
| Drained aspirated 30% Br$_2$ Beads | 290 ppm |
| Air-Dried Beads 27% Br$_2$ | 80 ppm |

Storage stability comparison was also made between the airdried resin and the moist resin prepared as described above. The results are summarized in Table C.

TABLE C
Effects of Aging and Temperature on Initial Br$_2$ Release and Br$_2$ Loss

| Samples | Storage Temperature | 12-Month Storage | |
| --- | --- | --- | --- |
| | | Initial Br$_2$ | Br$_2$ Loss After Storage |
| Drained aspirated (30% Br$_2$) Beads | 72° F. | 170 ppm | 20% |
| Drained aspirated (30% Br$_2$) Beads | 95° F. | 7 ppm | 98% |
| Air-Dried (27% Br$_2$) Beads | 72° F. | 50 ppm | 29% |
| Air-Dried (27% Br$_2$) Beads | 95° F. | 60 ppm | 38% |

We claim:
1. The method of preparing a stabilized polybromide resin product for use in disinfecting potable water, in which water-containing porous beads of quaternary ammonium anion exchange resin are loaded with bromine, wherein the improvement comprises:
 (a) loading said resin beads in a bromine-containing water slurry, said loading providing the beads with excess bromine above the bromine content desired in the final product.
 (b) removing external water from the loaded beads while leaving the beads in a moist sticky condition, said beads containing from 20 to 50% bromine based on the weight of the loaded beads;
 (c) passing a moisture-evaporating carrier gas through a mass of said moist beads at a controlled temperature and velocity effective to remove internal water gradually therefrom, the bromine content of said beads also being reduced as said internal water is removed; and
 (d) continuing the gradual drying of step (c) until said beads are in an externally dry free-flowing condition containing less than 5% water by weight and from 17 to 47% bromine based on the final weight of the beads, whereby the resulting resin product provides increased bromine stability and more uniform bromine release.

2. The stabilized polybromide resin product produced by the method of improvement of claim 1.

3. The method of improvement of claim 1 in which said step (c) is continued until said resin beads contain from 0.2 to 4.0% water based on the weight of the final weight of the beads.

4. The method of improvement of claim 1 in which said step (c) is continued until said resin beads contain from 0.5 to 2.0% water based on the final weight of the beads.

5. The method of improvement of claim 1 in which said resin comprises a styrene polymer providing benzyltrimethyl ammonium anion exchange sites.

6. The method of improvement of claim 1 in which said resin beads are initially loaded with from 28 to 38% bromine based on the weight of the beads, and in step (c) the bromine content is reduced to from 25 to 35% based on the final weight of the beads.

7. The method of preparing a stabilized polybromide resin product for use in disinfecting water, in which water-containing porous beads of a quaternary ammonium anion exchange resin are loaded with bromine, wherein the improvement comprises:
 (a) loading said resin beads in a bromine-containing water slurry thereof, said loading providing the beads with excess bromine above the bromine content desired in the final product;

(b) removing external water from the loaded beads while leaving the beads in a moist sticky condition, said beads containing from 28 to 38% bromine based on the weight of loaded beads and being at least partially in pentabromide form;

(c) passing moisture-evaporating air through a mass of said moist beads at a controlled temperature and velocity effective to remove internal water gradually therefrom, the bromine content of said beads also being reduced as said internal water is removed; and (d) continuing the gradual drying of step (c) until said beads contain from 0.5 to 2.0% water and from 25 to 35% bromine based on the final weight of the beads said beads remaining at least partially in the pentabromide form, whereby the resulting resin product provides increased bromine stability and more uniform bromine release.

8. The stabilized polybromide resin product produced by the method improvement of claim 7.

9. The method improvement of claim 7 in which said resin comprises a styrene polymer providing benzyltrimethyl ammonium anion exchange sites.

* * * * *